United States Patent
Kishida et al.

[11] Patent Number: 6,065,112
[45] Date of Patent: May 16, 2000

[54] MICROPROCESSOR WITH ARITHMETIC PROCESSING UNITS AND ARITHMETIC EXECUTION UNIT

[75] Inventors: Takeshi Kishida; Masaitsu Nakajima, both of Osaka, Japan

[73] Assignee: Matsushita Electric Industrial Co., Ltd., Osaka, Japan

[21] Appl. No.: 09/098,448

[22] Filed: Jun. 17, 1998

[30] Foreign Application Priority Data

Jun. 18, 1997 [JP] Japan .................................. 9-160736
Jul. 4, 1997 [JP] Japan .................................. 9-179422

[51] Int. Cl.[7] .............................. G06F 9/302; G06F 9/38
[52] U.S. Cl. ...................... 712/221; 712/206; 712/203; 712/23; 708/524
[58] Field of Search ............................. 712/221, 43, 209, 712/206, 203, 24, 23, 215; 708/490, 524

[56] References Cited

U.S. PATENT DOCUMENTS

| | | | |
|---|---|---|---|
| 5,404,469 | 4/1995 | Chung et al. | 712/215 |
| 5,805,913 | 9/1998 | Guttag et al. | 712/209 |

FOREIGN PATENT DOCUMENTS

| | | |
|---|---|---|
| 56-021237 | 2/1981 | Japan . |
| 01088840 | 4/1989 | Japan . |
| 07013762 | 1/1995 | Japan . |
| 07044504 | 2/1995 | Japan . |
| 07225684 | 8/1995 | Japan . |
| 08101805 | 4/1996 | Japan . |

*Primary Examiner*—Daniel H. Pan
*Attorney, Agent, or Firm*—McDermott, Will & Emery

[57] ABSTRACT

Along with an arithmetic processing unit and an arithmetic execution unit, another arithmetic processing unit is coupled in parallel to an instruction issue unit. Disposed within one of the arithmetic processing units are an address generation unit, an instruction buffer, an instruction decoder, an arithmetic execution unit, a data memory, and a flag register. The instruction decoder decodes an instruction read from the instruction buffer. If the decoded instruction is an iteration start instruction, the instruction decoder extracts a number of times an iterative process is to be executed that is included in the instruction for forwarding to the address generation unit. The address generation unit exerts control as to the execution and termination of iterative processes.

14 Claims, 12 Drawing Sheets

21   22

| NUMBER | EUB | MNEMONIC |
|---|---|---|
| 1 | 00 | OP1 |
| 2 | 00 | OP2 |
| 3 | 01 | EX1-OP1 |
| 4 | 01 | EX1-OP2 |
| 5 | 01 | EX1-OP3 |
| 6 | 01 | EX1-OP4 |
| 7 | 00 | OP3 |
| 8 | 00 | OP4 |
| 9 | 00 | OP5 |
| 10 | 00 | OP6 |
| 11 | 10 | EX2-OP1 |
| 12 | 10 | EX2-OP2 |

| NUMBER | MNEMONIC |
|---|---|
| 1 | EX1-OP1 |
| 2 | LOOP#0x03 |
| 3 | EX1-OP2 |
| 4 | EX1-OP3 |
| 5 | EX1-OP4 |
| 6 | LOOP-end |

Fig. 8

| NUMBER | MNEMONIC |
|---|---|
| 1 | EX1-OP1 |
| 2 | LOOP#0x02 |
| 3 | EX1-OP2 |
| 4 | EX1-OP3 |
| 5 | EX1-OP4 |
| 6 | LOOP#0x02 |
| 7 | EX1-OP5 |
| 8 | EX1-OP6 |
| 9 | LOOP-end |
| 10 | EX1-OP7 |
| 11 | LOOP-end |

Fig. 9

| NUMBER | | MNEMONIC |
|---|---|---|
| 1 | | EX1-OP1 |
| 2 | | EX1-OP2 |
| 3 | | CEXEC#ZE#LABEL |
| 4 | | EX1-OP3 |
| 5 | | EX1-OP4 |
| 6 | #LABEL | EX1-OP5 |
| 7 | | EX1-OP6 |

MACRO DEFINITION INSTRUCTION

MACRO CALL INSTRUCTION

Fig. 12

| NUMBER | EUB | MNEMONIC |
|---|---|---|
| 1 | 00 | OP1 |
| 2 | 00 | OP2 |
| 3 | 10 | dmacro |
| 4 | 10 | dm-OP1 |
| 5 | 10 | dm-OP2 |
| 6 | 10 | dm-OP3 |
| 7 | 10 | EX2-OP1 |
| 8 | 10 | EX2-OP2 |
| 9 | 10 | EX2-OP3 |
| 10 | 10 | MACRO1 |
| 11 | 10 | MACRO2 |
| 12 | 10 | MACRO3 |
| 13 | 10 | EX2-OP4 |
| 14 | 10 | EX2-OP5 |
| 15 | 00 | OP3 |
| 16 | 00 | OP4 |
| 17 | 00 | OP5 |
| 18 | 00 | OP6 |
| 19 | 00 | OP7 |
| 20 | 00 | OP8 |
| 21 | 00 | OP9 |

MICROPROCESSOR WITH ARITHMETIC PROCESSING UNITS AND ARITHMETIC EXECUTION UNIT

BACKGROUND OF THE INVENTION

This invention relates to a microprocessor capable of parallel execution of a plurality of instructions.

Various processor architectures, such as superscalar and multithread, have been known in the art. The use of these processor architectures makes it possible to simultaneously execute a plurality of instructions in one cycle and high-performance microprocessors can be provided.

However, commonly-used microprocessors of an instruction parallel-execution type have problems with facilitating the process of programming in various respects such as the necessity of avoidance of data dependencies.

SUMMARY OF THE INVENTION

Accordingly, an object of the present invention is to provide a high-performance microprocessor capable of being programmed with ease.

In order to achieve the foregoing object, the present invention employs a microprocessor structure in which a plurality of arithmetic processing units are connected to a single instruction issue unit in order to concurrently execute a plurality of instructions, and at least a particular one of the arithmetic processing units is made able to autonomously execute a series of arithmetic operations. Owing to the microprocessor structure of the present invention, the process of programming as to a group of instructions to be executed by the particular arithmetic processing unit can be facilitated.

The above-described microprocessor structure of the present invention will be described by giving a concrete embodiment thereof. A microprocessor structure in accordance with the present invention comprises a plurality of arithmetic processing units, an instruction memory for storing pluralities of instructions to be executed in the arithmetic processing units respectively, and an instruction issue unit for fetching an instruction from the instruction memory and for providing the fetched instruction to a corresponding one of the arithmetic processing units. In this microprocessor structure, at least a particular one of the arithmetic processing units includes an instruction buffer for holding a plurality of instructions provided from the instruction issue unit, an instruction decoder for decoding an instruction read from the instruction buffer, an arithmetic execution unit for executing an arithmetic operation according to a result of the decoding by the instruction decoder, and an address generation unit for generating a write address of the instruction buffer (i.e., an address representative of a location within the instruction buffer to which a write operation is to be performed) in response to a control signal received from the instruction issue unit and for generating a read address of the instruction buffer (i.e., an address representative of a location within the instruction buffer from which a read operation is to be performed) in response to a control signal received from the instruction decoder.

A variation to the foregoing microprocessor structure of the present invention can be made in which the instruction buffer of the particular arithmetic processing unit stores an instruction for control of an iterative process (e.g., an iteration start instruction and an iteration stop instruction) and an instruction for control of a conditional execution process (e.g., a conditional branch instruction). Another variation to the foregoing microprocessor structure of the present invention can be made in which a macro definition region (i.e., a region in which to store a macro body) is secured in the instruction buffer. Still another variation to the foregoing microprocessor structure of the present invention can be made in order to allow the foregoing particular arithmetic processing unit to autonomously perform a macro expansion process on the basis of a macro call instruction by making reference to a plurality of instructions forming a macro body stored in the macro definition region (hereinafter called macro forming instructions in some cases).

BRIEF DESCRIPTION OF THE DRAWINGS

FIG. 8 is a diagram of still another example of the execution instruction string including a double iterative process in the microprocessor of FIG. 1.

FIG. 9 is a diagram of yet another example of the execution instruction string including a conditional branch instruction in the microprocessor of FIG. 1.

FIG. 12 is a diagram of another example of the execution instruction string including a macro definition instruction and a macro call instruction in the microprocessor of FIG. 1.

DETAILED DESCRIPTION OF THE INVENTION

Figure 1:
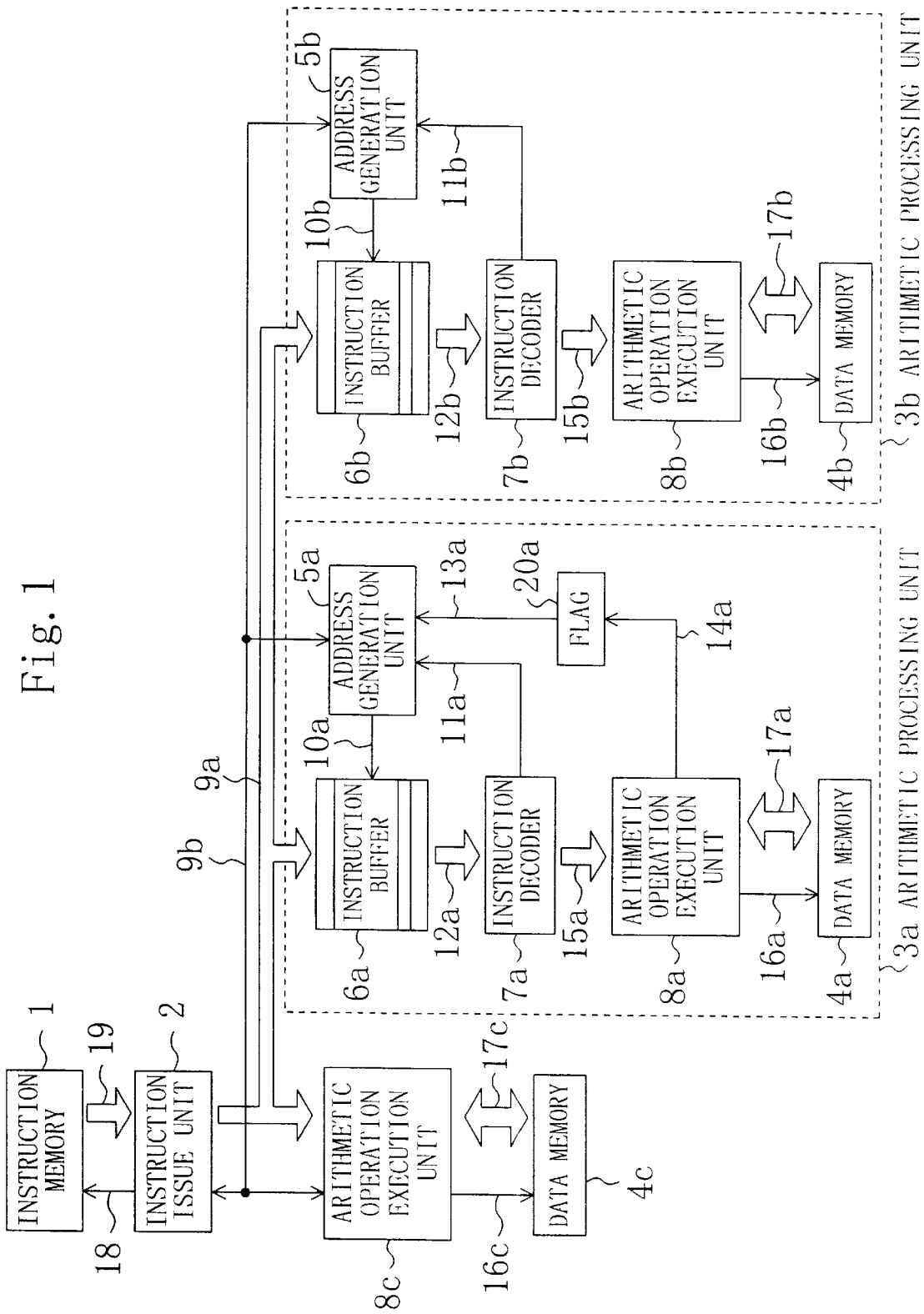
FIG. 1 is a block diagram showing an example of the structure of a microprocessor in accordance with the present invention.

FIG. 1 is an illustration of an example of the structure of a microprocessor of the present invention. Referring to FIG. 1, the microprocessor comprises an instruction memory 1, an instruction issue unit 2, a first arithmetic processing unit 3a, a second arithmetic processing unit 3b, an arithmetic execution unit 8c, and a data memory 4c. The instruction memory 1 stores pluralities of instructions for the units 3a, 3b, and 8c respectively. The instruction issue unit 2 provides an address and a control signal to the instruction memory 1 by way of a control bus 18 and fetches an instruction stored in the instruction memory 1 by way of an instruction bus 19 for forwarding to an instruction bus 9a. If the instruction issue unit 2 fetches from the instruction memory 1 an instruction to be executed in the arithmetic execution unit 8c, the instruction issue unit 2 decodes the fetched instruction. An instruction bus 9b is provided and establishes communication of control signals between the arithmetic execution unit 8c and the instruction issue unit 2. The arithmetic execution unit 8c receives from the instruction issue unit 2 an instruction decode result by way of the instruction bus 9a and executes an arithmetic operation according to the received decode result. The data memory 4c receives an address and a control signal from the arithmetic execution unit 8c by way of a control bus 16c, and a data bus 17c establishes communication of data between the arithmetic execution unit 8c and the data memory 4c.

The first arithmetic processing unit 3a is capable of autonomously executing iterative processing and conditional execution processing. The first arithmetic processing unit 3a comprises the following components: an instruction buffer 6a for holding a plurality of instructions provided from the instruction issue unit 2 by way of the instruction bus 9a; an instruction decoder 7a for receiving an instruction read from the instruction buffer 6a by way of an instruction bus 12a for decoding thereof; an arithmetic execution unit 8a for receiving an instruction decode result from the instruction decoder 7a by way of an instruction bus 15a and for executing an arithmetic operation according to the received decode result; a data memory 4a for receiving an address and a control signal from the arithmetic execution unit 8a by way of a control bus 16a and for performing communication of data with the arithmetic execution unit 8a by way of a data bus 17a; a flag register 20a for receiving an arithmetic operation result flag from the arithmetic execution unit 8a by way of a control bus 14a for storage thereof; and an address generation unit 5a for performing communication of control signals with the instruction issue unit 2 by way of the control bus 9b, for receiving a control signal from the instruction decoder 7a by way of a control bus 11a, for making reference to the arithmetic operation result flag stored in the flag register 20a by way of a control bus 13a, and for outputting a write address and a read address of the instruction buffer 6a by way of an address bus 10a.

The second arithmetic processing unit 3b has a macro capability. The second arithmetic processing unit 3b comprises the following components: an instruction buffer 6b for storing a plurality of instructions provided from the instruction issue unit 2 by way of the instruction bus 9a; an instruction decoder 7b for receiving an instruction read from the instruction buffer 6b by way of an instruction bus 12b for decoding thereof; an arithmetic execution unit 8b for receiving an instruction decode result from the instruction decoder 7b by way of an instruction bus 15b and for executing an arithmetic operation according to the received decode result; a data memory 4b for receiving an address and a control signal from the arithmetic execution unit 8b by way of a control bus 16b and for performing communication of data with the arithmetic execution unit 8b by way of a data bus 17b; and an address generation unit 5b for receiving a control signal from the instruction issue unit 2 by way of the control bus 9b, for receiving a control signal from the instruction decoder 7b by way of a control bus 11b, and for outputting a write address and a read address of the instruction buffer 6b by way of an address bus 10b.

Figure 2:
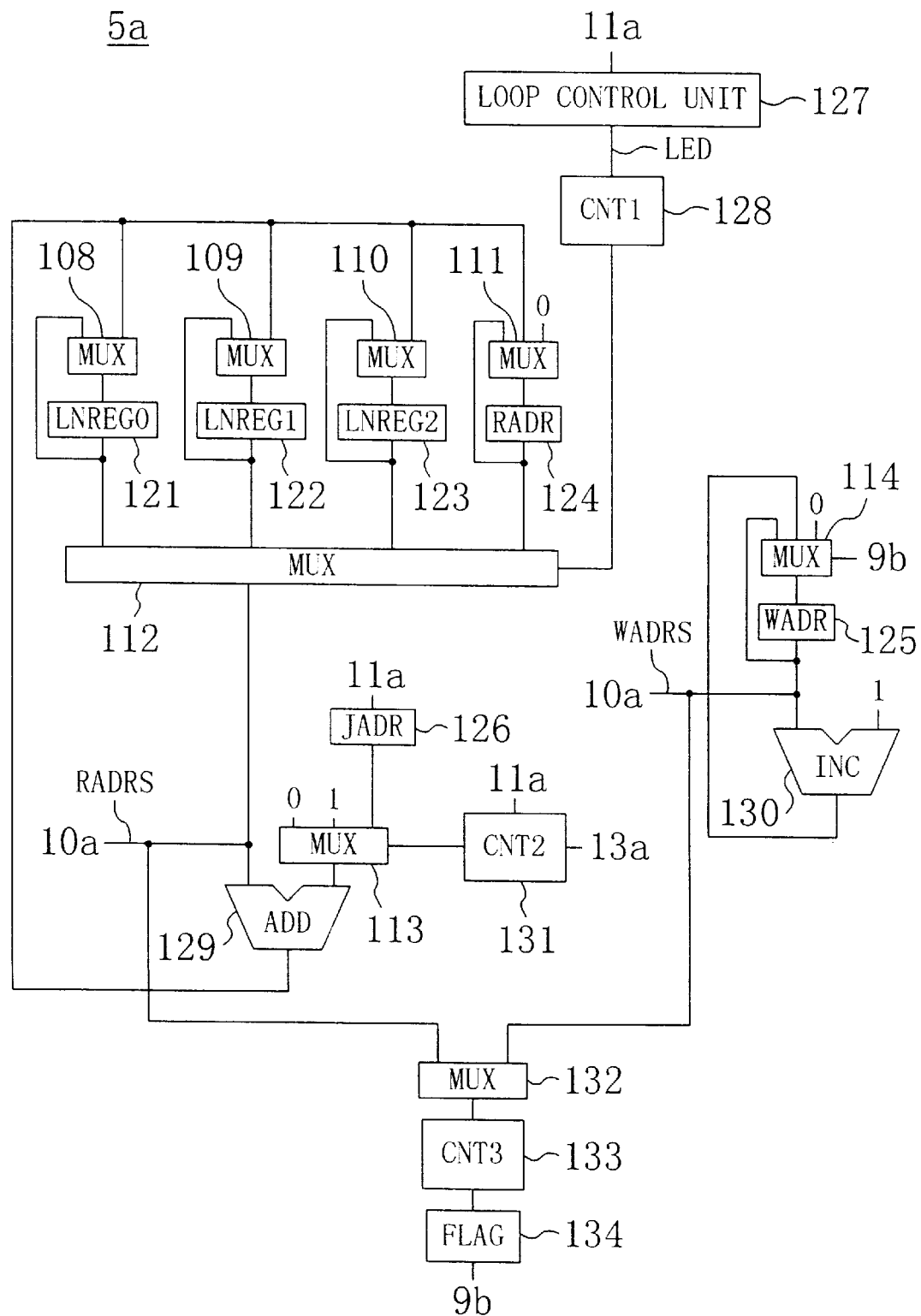
FIG. 2 is a detail block diagram of the structure of an address generation unit of a first arithmetic processing unit of FIG. 1.

FIG. 2 shows in detail the structure of the address generation unit 5a of FIG. 1. Referring to FIG. 2, 108–110 are multiplexers with two input terminals and a single output terminal. 111 is a multiplexer with three input terminals and a single output terminal. 112 is a multiplexer with four input terminals and a single output terminal. The multiplexer 112 is also provided with a single control input terminal. 113 is a multiplexer with three input terminals and a single output terminal. The multiplexer 113 is also provided with a single control input terminal. 121–124 are registers with a single input terminal and a single output terminal. 129 is an adder with two input terminals and a single output terminal. The register (LNREG0) 121 can store the address of an instruction subsequent to an iteration start instruction in the instruction buffer 6a. The input terminal of the register 121 is coupled to the output terminal of the 2-input multiplexer 108 and the output terminal thereof is coupled to the first input terminal of the 4-input multiplexer 112 and to the first input terminal of the 2-input multiplexer 108. The register (LNREG1) 122 can store the address of an instruction subsequent to another iteration start instruction in the instruction buffer 6a. The input terminal of the register 122 is coupled to the output terminal of the 2-input multiplexer 109 and the output terminal thereof is coupled to the second input terminal of the 4-input multiplexer 112 and to the first input terminal of the 2-input multiplexer 109. The register (LNREG2) 123 can store the address of an instruction subsequent to yet another iteration start instruction in the instruction buffer 6a. The input terminal of the register 123 is coupled to the output terminal of the 2-input multiplexer 110 and the output terminal thereof is coupled to the third input terminal of the 4-input multiplexer 112 and to the first input terminal of the 2-input multiplexer 110. The register (RADR) 124 can store a read address of the instruction buffer 6a. The input terminal of the register 124 is coupled to the output terminal of the 3-input multiplexer 111 and the output terminal thereof is coupled to the fourth input terminal of the 4-input multiplexer 112 and to the first input terminal of the 3-input multiplexer 111. The output terminal of the 4-input multiplexer 112 is coupled to the first input terminal of the adder 129. The output terminal of the 4-input multiplexer 112 is also coupled to the address bus 10a for the transmission of a read address RADRS to the instruction buffer 6a. The second input terminal of the adder 129 is coupled to the output terminal of the 3-input multiplexer 113 and the output terminal thereof is coupled to the second input terminals of the multiplexers 108–111. A fixed (constant) value of zero is applied at the third input terminal of the 3-input multiplexer 111.

127 is a loop control unit with a single input terminal and a single output terminal. 128 is a control block (CNT1) with a single input terminal and a single output terminal. The output terminal of the loop control unit 127 is coupled to the instruction decoder 7a via the control bus 11a. The output of the loop control unit 127 in the form of a loop end signal LED is provided to the input terminal of the control block 128. The output terminal of the control block 128 is coupled to the control input terminal of the 4-input multiplexer 112.

126 is a register with a single input terminal and a single output terminal. 131 is a control block (CNT2) with two input terminals and a single output terminal. A fixed value of zero is applied at the first input terminal of the 3-input multiplexer 113 and a fixed value of one is applied at the second input terminal thereof. The register (JADR) 126 can store a relative jump address in the instruction buffer 6a. The input terminal of the register 126 is coupled to the instruction decoder 7a via the control bus 11a and the output terminal thereof is coupled to the third input terminal of the 3-input multiplexer 113. The first input terminal of the control block 131 is coupled to the flag register 20*a* via the control bus 13*a*, the second input terminal thereof is coupled to the instruction decoder 7*a* via the control bus 11*a*, and the output terminal thereof is coupled to the control input terminal of the 3-input multiplexer 113.

114 is a 3-input multiplexer with three input terminals and a single output terminal. The multiplexer 114 is also provided with a single control input terminal. 125 is a register with a single input terminal and a single output terminal. 130 is an incrementer with two input terminals and a single output terminal. The register (WADR) 125 can store a write address of the instruction buffer 6*a*. The input terminal of the register 125 is coupled to the output terminal of the 3-input multiplexer 114 and the output terminal thereof is coupled to the first input terminal of the 3-input multiplexer 114 and to the first input terminal of the incrementer 130. The output terminal of the register 125 is also coupled to the address bus 10*a* for the transmission of a write address WADRS to the instruction buffer 6*a*. The second input terminal of the 3-input multiplexer 114 is fed the output of the incrementer 130 and a fixed value of zero is applied at the third input terminal of the 3-input multiplexer 114. The control input terminal of the 3-input multiplexer 114 is coupled to the instruction issue unit 2 via the control bus 9*b*.

132 is a 2-input multiplexer with two input terminals and a single output terminal. 133 is a control block (CNT3) with a single input terminal and a single output terminal. 134 is a flag register with a single input terminal and a single output terminal. The first and second input terminals of the 2-input multiplexer 132 are coupled to the output terminal of the 4-input multiplexer 112 and to the output terminal of the register 125 respectively. The output terminal of the 2-input multiplexer 132 is coupled to the input terminal of the control block 133. The output terminal of the control block 133 is coupled to the input terminal of the flag register 134. The output terminal of the flag register, 134 is coupled to the instruction issue unit 2 via the control bus 9*b*. The control block 133 has 1-bit storage parts for address values put therein through the 2-input multiplexer 132.

Figure 3:
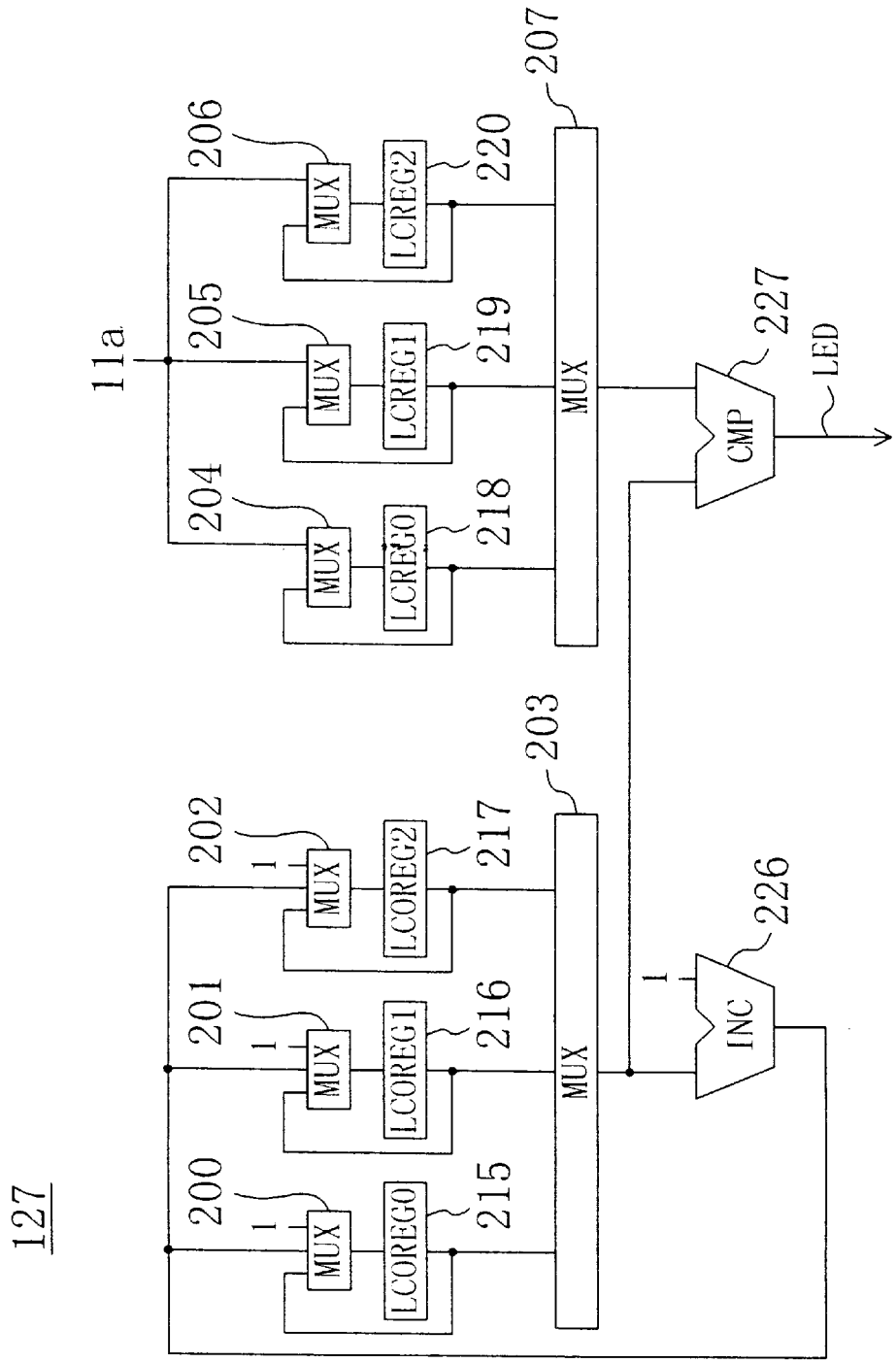
FIG. 3 is a detail block diagram of the structure of a loop control unit of FIG. 2.

FIG. 3 is a detail illustration of the structure of the loop control unit 127 of FIG. 2. Referring to FIG. 3, 200–202 are multiplexers with three input terminals and a single output terminal. 204–206 are multiplexers with two input terminals and a single output terminal. 203 and 207 are multiplexers with three input terminals and a single output terminal. 215–220 are registers with a single input terminal and a single output terminal. 226 is an incrementer with two input terminals and a single output terminal. 227 is a comparator with two input terminals and a single output terminal. The register (LCOREG0) 215 can store the number of times an iterative process has been completed. The input terminal of the register 215 is coupled to the output terminal of the 3-input multiplexer 200 and the output terminal thereof is coupled to the first input terminal of the 3-input multiplexer 203 and to the first input terminal of the 3-input multiplexer 200. The register (LCOREG1) 216 can store the number of times an internal iterative process has been completed. The input terminal of the register 216 is coupled to the output terminal of the 3-input multiplexer 201 and the output terminal thereof is coupled to the second input terminal of the 3-input multiplexer 203 and to the first input terminal of the 3-input multiplexer 201. The register (LCOREG2) 217 can store the number of times a further internal iterative process has been completed. The input terminal of the register 217 is coupled to the output terminal of the 3-input multiplexer 202 and the output terminal thereof is coupled to the third input terminal of the 3-input multiplexer 203 and to the first input terminal of the 3-input multiplexer 202. The output terminal of the 3-input multiplexer 203 is coupled to the first input terminal of the incrementer 226 and to the first input terminal of the comparator 227. The output terminal of the incrementer 226 is coupled to the second input terminals of the 3-input multiplexers 200–202. A fixed value of one is applied at each of the third input terminals of the 3-input multiplexers 200–202.

The register (LCREG0) 218 can store the number of times an iterative process is to be executed. The input terminal of the register 218 is coupled to the output terminal of the 2-input multiplexer 204 and the output terminal thereof is coupled to the first input terminal of the 3-input multiplexer 207 and to the first input terminal of the 2-input multiplexer 204. The register (LCREG1) 219 can store the number of times an internal iterative process is to be executed. The input terminal of the register 219 is coupled to the output terminal of the 2-input multiplexer 205 and the output terminal thereof is coupled to the second input terminal of the 3-input multiplexer 207 and to the first input terminal of the 2-input multiplexer 205. The register (LCREG2) 220 can store the number of times a further internal iterative process is to be executed. The input terminal of the register 220 is coupled to the output terminal of the 2-input multiplexer 206 and the output terminal thereof is coupled to the third input terminal of the 3-input multiplexer 207 and to the first input terminal of the 2-input multiplexer 206. The output terminal of the 3-input multiplexer 207 is coupled to the second input terminal of the comparator 227. Each of the second input terminals of the 2-input multiplexers 204–206 is coupled to the instruction decoder 7*a* via the control bus 11*a*. The output of the comparator 227 is the output LED of the loop control unit 127.

Each of the control input terminals of the multiplexers 108–111 and 200–207 is coupled to the instruction decoder 7*a* via the control bus 11*a*. However, the multiplexer control input of these multiplexers is not shown in FIGS. 2 and 3.

Figures 4, 5:
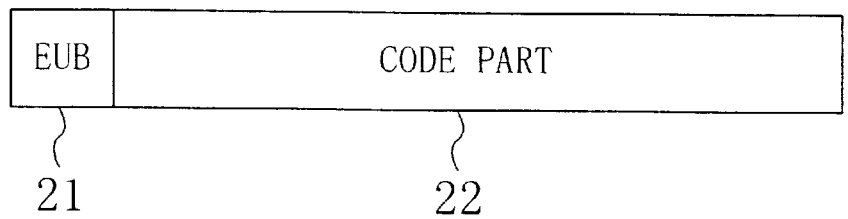
FIG. 4 is a diagram of an example of the instruction format in the microprocessor of FIG. 1.
FIG. 5 is a diagram of an example of the execution instruction string in the microprocessor of FIG. 1.

FIG. 4 shows an example of the format of an instruction stored in the instruction memory 1 of FIG. 1. Referring to FIG. 4, 21 is an execution unit designation bit (EUB). 22 is a code part. The EUB 21 is a part of two bits for determining which of the three units (the arithmetic execution unit 8*c*, the first arithmetic processing unit 3*a*, and the second arithmetic processing unit 3*b*) executes an instruction. If EUB is represented in binary notation, then EUB=00 designates the arithmetic execution unit 8*c*, EUB=01 designates the first arithmetic processing unit 3*a*, and EUB=10 designates the second arithmetic processing unit 3*b*. The code part 22 represents the contents of execution of an instruction and contains an operation code and an operand. For the case of conditional branch instructions, a conditional code and a relative jump address are defined in the code part 22.

The operation of the microprocessor as illustrated in FIG. 1 is now described. The instruction issue unit 2 sends an address and a read enable signal to the instruction memory 1 over the control bus 18 and fetches from the instruction memory 1 an instruction by way of the instruction bus 19. In the next step, the fetched instruction is decoded in the instruction issue unit 2. In this decode process, the fetched instruction is partially decoded. In other words, the execution unit designation bit (EUB) 21 of the fetched instruction (see FIG. 4) is decoded. If EUB=00 (in binary notation), the instruction issue unit 2 then decodes also the code part 22 of the fetched instruction and the result of the decoding is sent to the arithmetic operation unit 8*c* by way of the instruction bus 9a. The operation of the microprocessor moves to an arithmetic execution process in the arithmetic execution unit 8c. If EUB=01, the instruction issue unit 2 then writes the code part 22 of the fetched instruction to the instruction buffer 6a within the first arithmetic processing unit 3a by way of the instruction bus 9a. If EUB=10, the instruction issue unit 2 then writes the code part 22 of the fetched instruction to the instruction buffer 6b within the second arithmetic processing unit 3b by way of the instruction bus 9a. In either case of EUB=01 and EUB=10, the operation of the microprocessor moves to the process of reading individual instructions from the instruction buffers 6a and 6b after the process of writing instructions to the instruction buffers 6a and 6b is finished. Thereafter, the operation of the microprocessor moves to the process of decoding instructions in the instruction decoders 7a and 7b and then to the process of executing arithmetic operations in the arithmetic execution units 8a and 8b.

FIG. 5 shows an example of the execution instruction string composed of twelve instructions in the microprocessor of FIG. 1. Binary codes for these twelve instructions of FIG. 5 are stored in the instruction memory 1. In this execution instruction string example, the first instruction (OP1) and the second instruction (OP2) each have an EUB of 00 and are therefore decoded up to their respective code parts 22 in the instruction issue unit 2. The results of the decoding are sent, by way of the instruction bus 9a, to the arithmetic execution unit 8c and corresponding arithmetic operations are executed. The third to sixth instructions (from EX1-OP1 to EX1-OP4) each have an EUB of 01 and are therefore written, by way of the instruction bus 9a, to the instruction buffer 6a within the first arithmetic processing unit 3a, and corresponding arithmetic operations are executed in the arithmetic execution unit 8a. Like the first and second instructions, the seventh to tenth instructions (from OP3 to OP6) each have an EUB of 00 and are therefore decoded up to their respective code parts 22 in the instruction issue unit 2. The results of the decoding are sent to the arithmetic execution unit 8c by way of the instruction bus 9a and corresponding arithmetic operations are executed. Lastly, the eleventh and twelfth instructions (EX2-OP1 and EX2-OP2) each have an EUB of 10 and are therefore written, by way of the instruction bus 9a, to the instruction buffer 6b within the second arithmetic processing unit 3b, and corresponding arithmetic operations are executed in the arithmetic execution unit 8b.

The details of the process of writing instructions to the instruction buffer 6a within the first arithmetic processing unit 3a are now described. Once a write operation to the instruction buffer 6a starts, the instruction issue unit 2 sends a control signal to the address generation unit 5a by way of the control bus 9b so that the multiplexer 114 selects its third input value (i.e., the fixed value of zero applied at the third input terminal of the multiplexer 114). The register 125 receives the value zero from the multiplexer 114 for storage therein. The value zero, stored in the register 125, is output to the address bus 10a as the initial value of the write address WADRS. Based on the write address WADRS, a write operation of an instruction, transferred from the instruction issue unit 2 to the instruction buffer 6a by way of the instruction bus 9a, is executed. If instructions are successively written to the instruction buffer 6a, the incrementer 130 increases the output value of the register 125 by one for every one clock cycle, the incremented value is stored by way of the multiplexer 114 as the next value of the register 125, the stored value is output as the write address of a next instruction of the instruction buffer 6a by way of the address bus 10a, and the successive instructions are written to at successive addresses of the instruction buffer 6a. In such an instruction write operation, a write enable signal is also sent to the instruction buffer 6a from the address generation unit 5a (not shown in FIG. 2) in order to permit an instruction to be written to at an address identified by the output of the register 125. In the absence of an instruction write operation from the instruction issue unit 2, the multiplexer 114 selects its first input value (i.e., the value applied at the first input terminal of the multiplexer 114). In other words, the register 125 is not updated. No write enable signals are applied to the instruction buffer 6a, as a result of which the instruction buffer 6a is placed in the wait state, waiting for an instruction write operation.

The write address WADRS output from the register 125 is sent to the control block 133 by way of the multiplexer 132. Within the control block 133, the value of a 1-bit storage part corresponding to the input write address WADRS is changed to one from zero. The output value of the control block 133 is the logical product (AND) of values of the 1-bit storage parts corresponding to all the addresses of the instruction buffer 6a. Such a logical product is stored in the flag register 134. In other words, the value of the flag register 134 (i.e., the status flag) is set at oen in order to prevent the instruction buffer 6a from being subjected to a write operation when all the 1-bit storage parts of the instruction buffer 6a are full of instructions that have not yet been read out. The output value of the flag register 134 is communicated to the instruction issue unit 2 by way of the control bus 9b for control of the issue of instructions to the first arithmetic processing unit 3a. Although not shown in FIG. 2, the output value of the flag register 134 is reflected also in the write enable signal to the instruction buffer 6a.

Figures 6, 7:
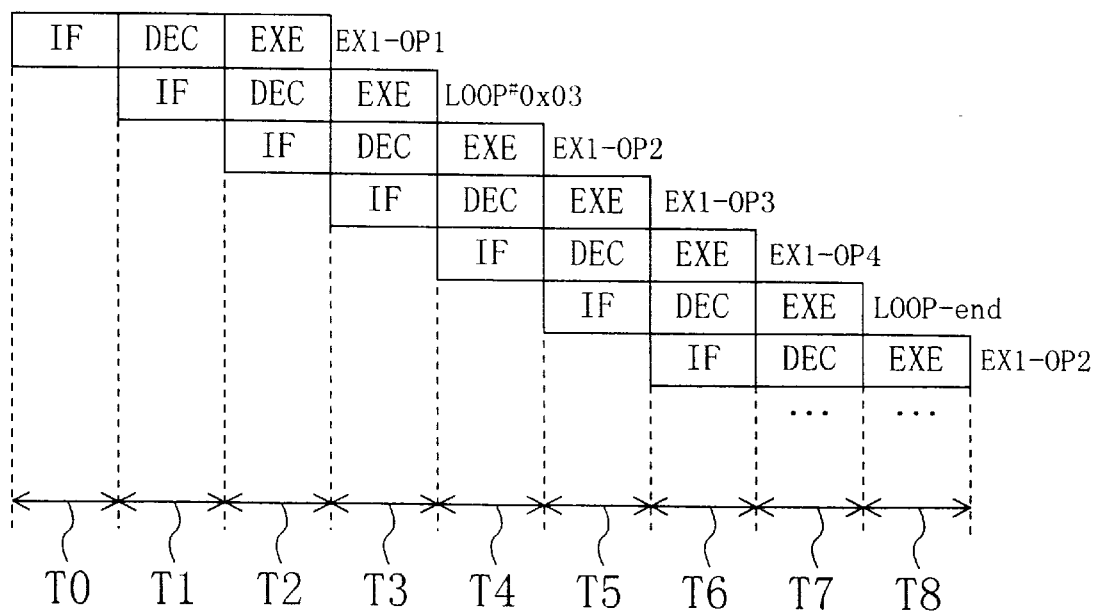
FIG. 6 is a diagram of another example of the execution instruction string including an iterative process in the microprocessor of FIG. 1.
FIG. 7 is a diagram of a pipeline structure of the microprocessor of FIG. 1 corresponding to the execution instruction string of FIG. 6.

FIG. 6 shows an example of the execution instruction string including an iterative process in the first arithmetic processing unit 3a. The second instruction (LOOP) of FIG. 6 is an iteration start instruction. The sixth instruction (LOOP-end) is an iteration stop instruction.

FIG. 7 shows a pipeline structure of the first arithmetic processing unit 3a on the basis of the execution instruction string of FIG. 6. The operation of the first arithmetic processing unit 3a is pipelined and has three stages. These three stages are an instruction fetch process (IF) for fetching instructions from the instruction buffer 6a, an instruction decode process (DEC) in the instruction decoder 7a, and an arithmetic operation execution process (EXE) in the arithmetic execution unit 8a. Each pipeline stage can be executed in one clock cycle. In FIG. 7, the rightward direction is the positive direction of time, the vertical downward direction is the flow of the execution instructions, and the individual cycles are identified by T0–T8 respectively.

At cycle T0, the first instruction (EX1-OP1) is read out from the instruction buffer 6a. In the address generation unit 5a, based on a control signal as an instruction execution start signal from the control bus 9b, the control block 128 provides a default control signal so that the multiplexer 112 selects its fourth input value (the value applied at the fourth input terminal of the multiplexer 112). The multiplexer 111 accepts a default control signal to choose its third input value (i.e., the fixed value of zero applied at the third input terminal of the multiplexer 111). As a result, the value of zero is stored in the register 124. The value zero, stored in the register 124, is output by way of the address bus 10a as the initial value of the read address RADRS of the instruction buffer 6a. At the same time, a read enable signal is applied from the address generation unit 5a to the instruction buffer 6a, and an instruction read operation from the instruction buffer 6a to the instruction decoder 7a by way of the instruction bus 12a is executed. The read address RADRS is sent also to the control block 133 by way of the multiplexer 132. According to the read address RADRS, the control block 133 executes an operation to bring the value of the 1-bit storage part, which was set at one at the write time, back to at zero.

At cycle T1, a decode operation of decoding the first instruction EX1-OP1 in the instruction decoder 7a and a read operation of reading the second instruction (i.e., the iteration start instruction (LOOP)) from the instruction buffer 6a are executed in parallel. The updating of a read address is described in detail. In the address generation unit 5a, the control signal is fixed such that the multiplexer 112 selects its fourth input value. At cycle T1, the value of the register 124, which is the read address RADRS of the instruction buffer 6a at cycle T0, is output by way of the multiplexer 112 to the adder 129. In the adder 129, a value of one is added to the output value of the register 124, and the result of the addition is brought back to the register 124 by way of the multiplexer 111 to update the value of the register 124. At cycle T1, control signals are applied such that the multiplexers 108–110 choose their respective first input values and the multiplexer 111 selects its second input value (i.e., the output value of the adder 129). Meanwhile, the control block 131 sends a default control signal to the multiplexer 113 so that the multiplexer 113 selects and sends its second input value (i.e., the fixed value of one) to the second input terminal of the adder 129. In this way, the read address RADRS which is provided to the instruction buffer 6a is incremented by one.

At cycle T2, an arithmetic operation of performing arithmetic on the first instruction in the arithmetic execution unit 8a, a decode operation of decoding the second instruction in the instruction decoder 7a, and a read operation of reading the third instruction (EX1-OP2) from the instruction buffer 6a are executed in parallel. If the first instruction is an instruction for storing a data processing result, the arithmetic execution unit 8a provides to the data memory 4a an address and a control signal by way of the control bus 16a and data by way of the data bus 17a. If the first instruction is an arithmetic operation instruction, an arithmetic operation result flag is stored in the flag register 20a via the control bus 14a according to an arithmetic operation result in the arithmetic execution unit 8a. The second instruction, which is an iteration start instruction, holds in its code part 22 a number of times an iterative process is to be executed (hereinafter called the iteration execution number). The iteration execution number is three in the examples shown in FIGS. 6 and 7. The iteration execution number is decoded in the instruction decoder 7a and is stored in the register 218 by way of the control bus 11a and the multiplexer 204. At this time, control signals are provided so that the multiplexer 204 selects its second input value (i.e., the value of the control bus 11a) and the multiplexers 205 and 206 choose their respective first input values. Meanwhile, a control signal is provided so that the multiplexer 108 selects its second input value (i.e., the output value of the adder 129), and the read address of the third instruction is stored in the register 121. The control signal applied to the multiplexer 108 is held so that the value of the register 121 can be held from the next cycle onward. The third instruction is read in the same way that the first and second instructions are read.

At cycle T3, an arithmetic operation of performing arithmetic on the second instruction, a decode operation of decoding the third instruction, and a read operation of reading the fourth instruction (EX1-OP3) are executed in parallel. Since the second instruction is an iteration start instruction, there exist no arithmetic execution operations. The decode operation of the third instruction and the read operation of the fourth instruction at cycle T3 are the same as at cycle T1.

At cycle T4, an arithmetic operation of performing arithmetic on the third instruction, a decode operation of decoding the forth instruction, and a read operation of reading the fifth instruction (EX1-OP4) are executed in parallel.

At cycle T5, an arithmetic operation of performing arithmetic on the fourth instruction, a decode operation of decoding the fifth instruction, and a read operation of reading the sixth instruction (i.e., the iteration stop instruction (LOOP-end)) are executed in parallel. The sixth instruction is read out and decoded in cycle T6. The instruction decoder 7a decodes the iteration stop instruction and thereafter provides a control signal so that the multiplexer 200 of the address generation unit 5a selects its third input value (i.e., the fixed value of one). As a result, the value one is stored in the register 215. Additionally, control signals are provided so that the multiplexers 203 and 207 choose their respective first input values. The comparator 227 compares the value of the register 215 and that of the register 218. Receiving the output of the comparator 227, the control block 128 provides, when the output of the comparator 227 shows that the value of the register 215 falls below that of the register 218, a control signal so that the multiplexer 112 selects its first input value. As a result of such control, the read address of an instruction subsequent to the sixth instruction becomes the value of the register 121 which is the first input value of the multiplexer 112 (i.e., an address in the instruction buffer 6a at which the third instruction (EX1-OP2) is stored). As a result, a read operation of reading the third instruction is executed again at cycle T6. The value of the register 124 is updated depending on the output of the adder 129.

By virtue of the foregoing process steps, the third to sixth instructions can be provided repeatedly from the instruction buffer 6a to the instruction decoder 7a. Further, every time the sixth instruction (i.e., the iteration stop instruction) is decoded, the value of the register 215 is incremented by the incrementer 226 by one. When the value of the register 215 is equal to that of the register 218, or when instruction readout from the instruction buffer 6a to the instruction decoder 7a is repeatedly carried out by a number of times set in the register 218, the control block 128 provides a default control signal so that the multiplexer 112 selects its fourth input value. As a result, the iterative process is brought into a stop for processing the following instructions. By the foregoing operations, iterative processing can be achieved in the first arithmetic processing unit 3a including the instruction buffer 6a.

FIG. 8 shows an example of the execution instruction string including a double iterative process in the first arithmetic processing unit 3a. An external iterative process, which is defined by the second and eleventh instructions, is carried out by the use of the registers 121, 215, and 218, as in the case of FIG. 6. When the sixth instruction, which is an internal iteration start instruction, is decoded in the instruction decoder 7a, control signals are provided so that the multiplexer 204 selects its first input value and the multiplexer 205 selects its second input value. As a result, an iteration number (i.e., the number of times iteration is to be carried out) relating to the decoded sixth instruction is stored in the register 219. A control signal is provided so that the multiplexer 109 selects its second input value, as a result of which the value of an address in the instruction buffer 6a, at which the seventh instruction next to an internal iteration start instruction is stored, is retained in the register 122. When the ninth instruction (the internal iteration stop instruction) is decoded in the instruction decoder 7a, a control signal is provided so that the multiplexer 201 selects its third input value (i.e., the fixed value of one), and this fixed value one is stored in the register 216. Additionally, a control signal is provided so that the multiplexer 203 selects its second input value (i.e., the output value of the register 216). Meanwhile, a control signal is provided so that the multiplexer 207 selects its second input value. The comparator 227 compares the value of the register 216 with that of the register 219. If the value of the register 216 is found by the comparator 227 to fall below that of the register 219, the control block 128 then provides a control signal so that the multiplexer 112 selects its second input value. As a result, the read address RADRS of the seventh instruction is provided to the instruction buffer 6a over the address bus 10a. In the way describe above, execution of the internal iterative process is controlled. In the examples of FIGS. 1–3, a triple iterative process can be achieved in the first arithmetic processing unit 3a including the instruction buffer 6a. Expansion to a quadruple or more iterative process can be achieved with ease.

FIG. 9 shows an example of the execution instruction string including a conditional branch instruction in the first arithmetic processing unit 3a. The third instruction (CEXEC) of FIG. 9 is a conditional branch instruction. When a zero flag (an operation result flag) specified by a conditional code ZE is set, instruction execution control is exercised to cause a jump to the sixth instruction (EX1-OP5). LABEL in the third instruction represents a relative jump to the sixth instruction. When the third instruction (the conditional branch instruction) is decoded in the instruction decoder 7a, a conditional code, decoded in the instruction decoder 7a, is provided to the control block 131 of the address generation unit 5a by way of the control bus 11a. A relative jump address is stored in the register 126 by way of the control bus 11a and is provided to the third input terminal of the multiplexer 113. Making reference to a conditional code provided from the instruction decoder 7a and to an arithmetic operation result flag stored in the flag register 20a, the control block 131 determines whether a condition match or mismatch takes place. If a condition match takes place, the control block 131 provides a control signal so that the multiplexer 113 selects its third input value (the relative jump address). On the other hand, if a condition mismatch takes place, the control block 131 provides a control signal so that the multiplexer 113 selects its second input value (the fixed value of one). The output value of the adder 129 (i.e., the next read address of the instruction buffer 6a) is changed according to the condition match/mismatch. By virtue of the foregoing operations, a conditional branch instruction process can be achieved in the first arithmetic processing unit 3a including the instruction buffer 6a.

Figure 10A:
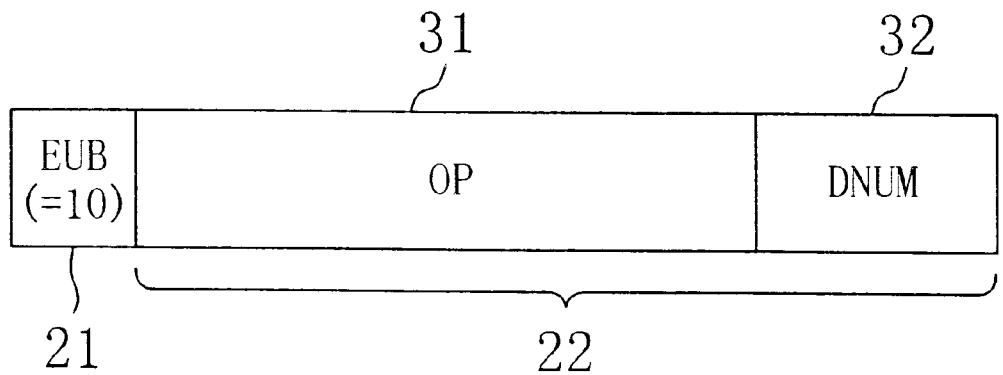
FIG. 10A is a diagram of an example of the format of a macro definition instruction in the microprocessor of FIG. 1
Figure 10B:
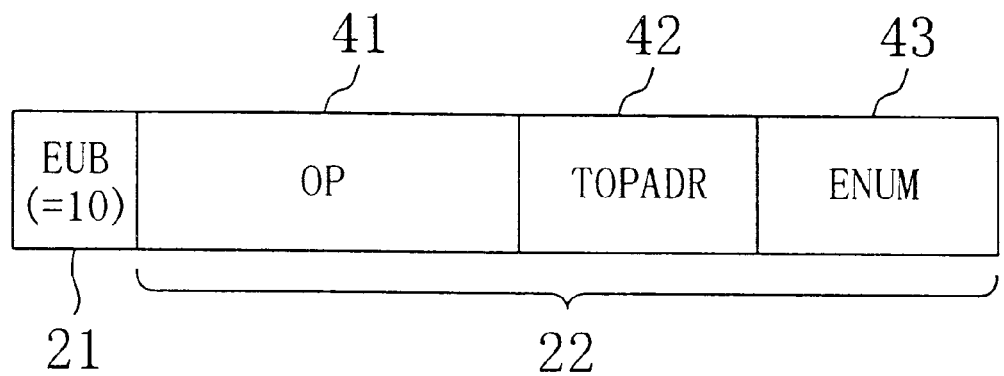
FIG 10B is a diagram of an example of the format of a macro call instruction in the microprocessor of FIG. 1.

FIG. 10A shows an example of the format of a macro definition instruction. FIG. 10B shows an example of the format of a macro call instruction. In FIGS. 10A and 10B, the EUB 21 is fixed at a value of 10 so that the second arithmetic processing unit 3b is designated. The code part 22 of the macro definition instruction contains an operation code (OP) 31 and an instruction number (DNUM) 32. The DNUM 32 represents the number of instructions forming a macro body relating to the macro definition instruction. The code part 22 of the macro call instruction contains an operation code (OP) 41, a top address (TOPADR) 42, and an instruction number (ENUM) 43. The TOPADR 42 locates where the first of the macro body forming instructions is stored in the instruction buffer 6b. The ENUM 43 represents the number of the instructions forming the macro body relating to the macro call instruction.

Figure 11:
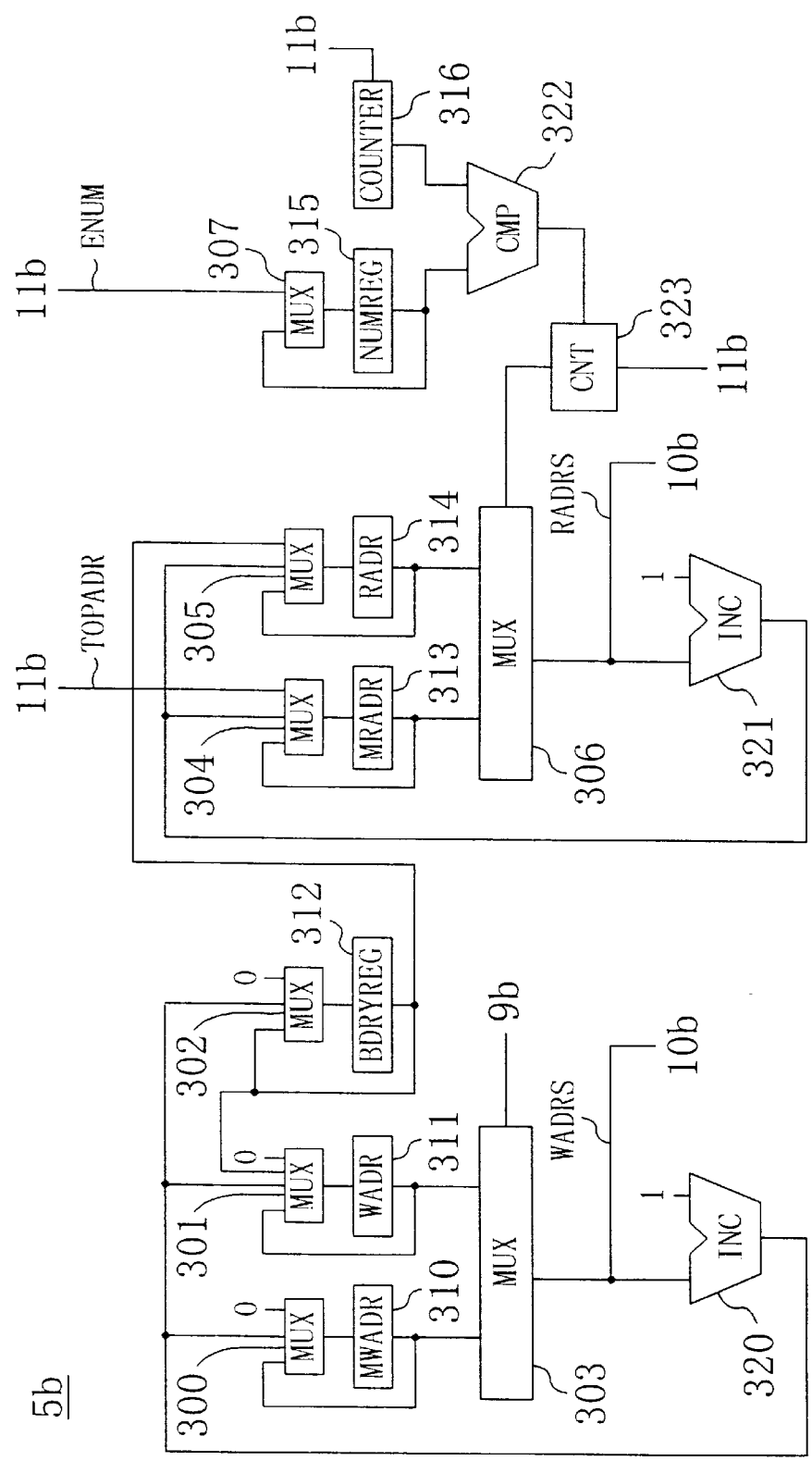
FIG. 11 is a detail block diagram of the structure of an address generation unit of a second arithmetic processing unit of FIG. 1.

FIG. 11 is a detail diagram of the structure of the address generation unit 5b of FIG. 1. Referring to FIG. 11, 300 and 302 are multiplexers with three input terminals and a single output terminal. 301 is a multiplexer with four input terminals and a single output terminal. 303 is a multiplexer with two input terminals and a single output terminal. The multiplexer 303 is also provided with a control input terminal. 310–312 are registers with a single input terminal and a single output terminal. 320 is an incrementer with two input terminals and a single output terminal. The register (MWADR) 310 can store an address in the instruction buffer 6b to which a macro forming instruction is to be written. The input terminal of the register 310 is coupled to the output terminal of the 3-input multiplexer 300 and the output terminal thereof is coupled to the first input terminal of the 2-input multiplexer 303 and to the first input terminal of the 3-input multiplexer 300. The register (WADR) 311 can store an address in the instruction buffer 6b to which a non-macro forming instruction is written. The input terminal of the register 311 is coupled to the output terminal of the 4-input multiplexer 301 and the output terminal thereof is coupled to the second input terminal of the 2-input multiplexer 303 and to the first input terminal of the 4-input multiplexer 301. The register (BDRYREG) 312 can store a boundary address (BDRY) in the instruction buffer 6b (i.e., an address located next to the last of the addresses in the macro definition region (the region for storing the macro forming instructions)). The input terminal of the register 312 is coupled to the output terminal of the 3-input multiplexer 302 and the output terminal thereof is coupled to the first input terminal of the 3-input multiplexer 302. The control input terminal of the 2-input multiplexer 303 is coupled to the instruction issue unit 2 via the control bus 9b. The output terminal of the 2-input multiplexer 303 is coupled to the first input terminal of the incrementer 320 and to the address bus 10b for the provision of the write address WADRS to the instruction buffer 6b. Each of the second input terminals of the multiplexers 300–302 is coupled to the output terminal of the incrementer 320. The third input terminal of the 4-input multiplexer 301 is coupled to the output terminal of the register 312. The third input terminal of the 3-input multiplexer 300, the fourth input terminal of the 4-input multiplexer 301, and the third input terminal of the 3-input multiplexer 302 are all fed a fixed value of zero.

304 and 305 are multiplexers with three input terminals and a single output terminal. 306 is a multiplexer with two input terminals and a single output terminal and is also provided with a control input terminal. 313 and 314 are registers with a single input terminal and a single output terminal. 321 is an incrementer with two input terminals and a single output terminal. The register (MRADR) 313 can store an address in the instruction buffer 6b from which a macro forming instruction is to be read out. The input terminal of the register 313 is coupled to the output terminal of the 3-input multiplexer 304 and the output terminal thereof is coupled to the first input terminal of the 2-input multiplexer 306 and to the first input terminal of the 3-input multiplexer 304. The register (RADR) 314 can store an address in the instruction buffer 6b from which a non-macro forming instruction is to be read out. The input terminal of the register 314 is coupled to the output terminal of the 3-input multiplexer 305 and the output terminal thereof is coupled to the second input terminal of the 2-input multiplexer 306 and to the first input terminal of the 3-input multiplexer 305. The output terminal of the 2-input multiplexer 306 is coupled to the first input terminal of the incrementer 321 and to the address bus 10b for the provision of the read address RADRS to the instruction buffer 6b. Each of the second input terminals of the 3-input multiplexers 304 and 305 is coupled to the output terminal of the incrementer 321. The third input terminal of the 3-input multiplexer 304 is coupled to the control bus 11b for receiving the top address TOPADR from the instruction decoder 7b. The third input terminal of the 3-input multiplexer 305 is coupled to the output terminal of the register 312.

307 is a 2-input multiplexer with two input terminals and a single output terminal. 315 is a register with a single input terminal and a single output terminal. 316 is a counter with a single control input terminal and a single output terminal. 322 is a comparator with two input terminals and a single output terminal. 323 is a control block (CNT) with two input terminals and a single output terminal. The register (NUMREG) 315 can store the number of instructions (ENUM) forming a macro body relating to a macro call instruction. The input terminal of the register 315 is coupled to the output terminal of the 2-input multiplexer 307 and the output terminal thereof is coupled to the first input terminal of the comparator 322 and to the first input terminal of the 2-input multiplexer 307. The second input terminal of the 2-input multiplexer 307 is coupled to the control bus 11b for receiving the instruction number ENUM from the instruction decoder 7b. The second input terminal of the comparator 322 is coupled to the output terminal of the counter 316. The control input terminal of the counter 316 is coupled to the instruction decoder 7b via the control bus 11b. The first input terminal of the control block 323 is coupled to the output terminal of the comparator 322 and the second input terminal thereof is coupled to the instruction decoder 7b via the control bus 11b. The output terminal of the control block 323 is coupled to the control input terminal of the 2-input multiplexer 306.

The control input terminals of the multiplexers 300–302 are coupled to the instruction issue unit 2 via the control bus 9b and the control input terminals of the multiplexers 304, 305, and 307 are coupled to the instruction decoder 7b via the control bus 11b. However, the control input of these multiplexers is not shown in FIG. 11.

FIG. 12 shows an example of the execution instruction string including a macro definition instruction and a macro call instruction in the microprocessor of FIG. 1. Binary codes for 21 instructions shown in FIG. 12 are stored in the instruction memory 1. Referring to FIG. 12, the third instruction (dmacro) is a macro definition instruction. The fourth to sixth instructions (from dm-OP1 to dm-OP3) are macro forming instructions. The tenth to twelfth instructions (from MACRO1 to MACRO3) are macro call instructions related to the third instruction.

Figure 13:
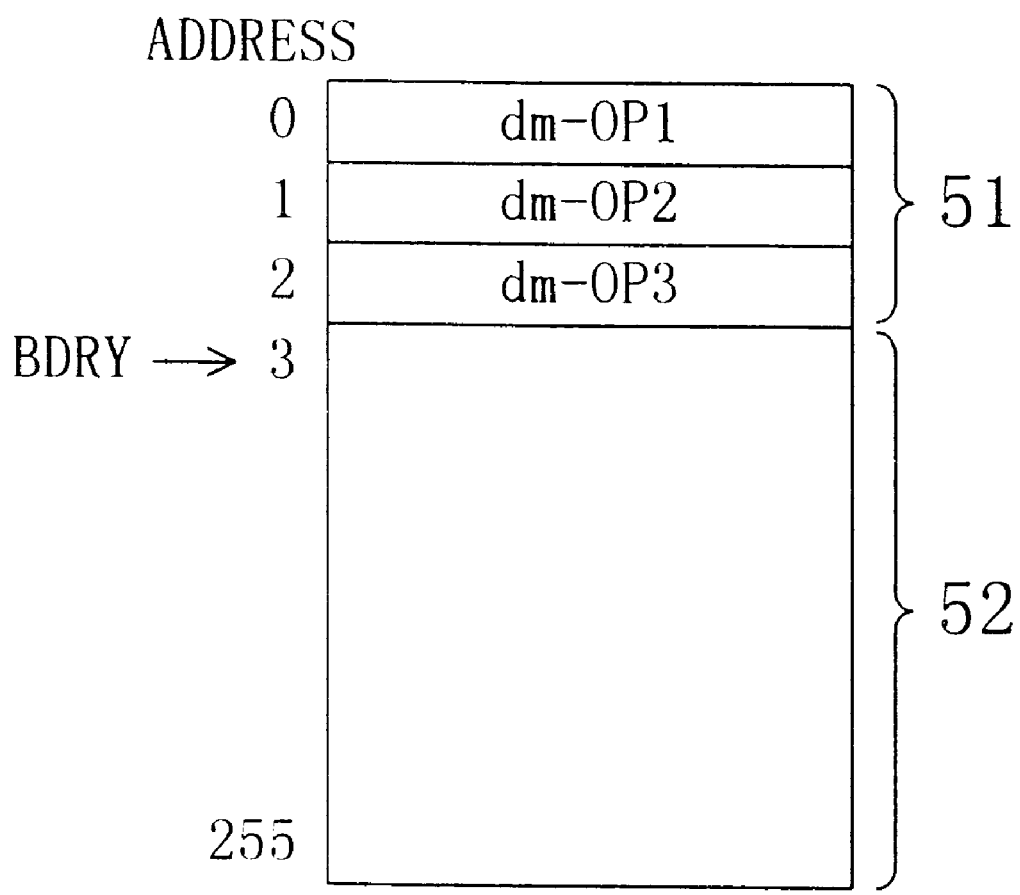
FIG. 13 is a detail diagram of the structure of an instruction buffer of the second arithmetic processing unit of FIG. 1.

FIG. 13 is a detail diagram of the structure of the instruction buffer 6b on the basis of the instruction string example of FIG. 12. The instruction buffer 6b has a macro definition region 51 where the three macro forming instructions (dm-OP1, dm-OP2, dm-OP3) are stored and an open region 52 for non-macro forming instructions, when the macro definition instruction (dmacro) is fetched from the instruction memory 1 as will be described in detail hereinafter. A boundary address BDRY is an address located next to the last of the addresses in the macro definition region 51 (i.e., the first of the addresses of the open region 52). The instruction buffer 6b comprises 256 words.

Figure 14:
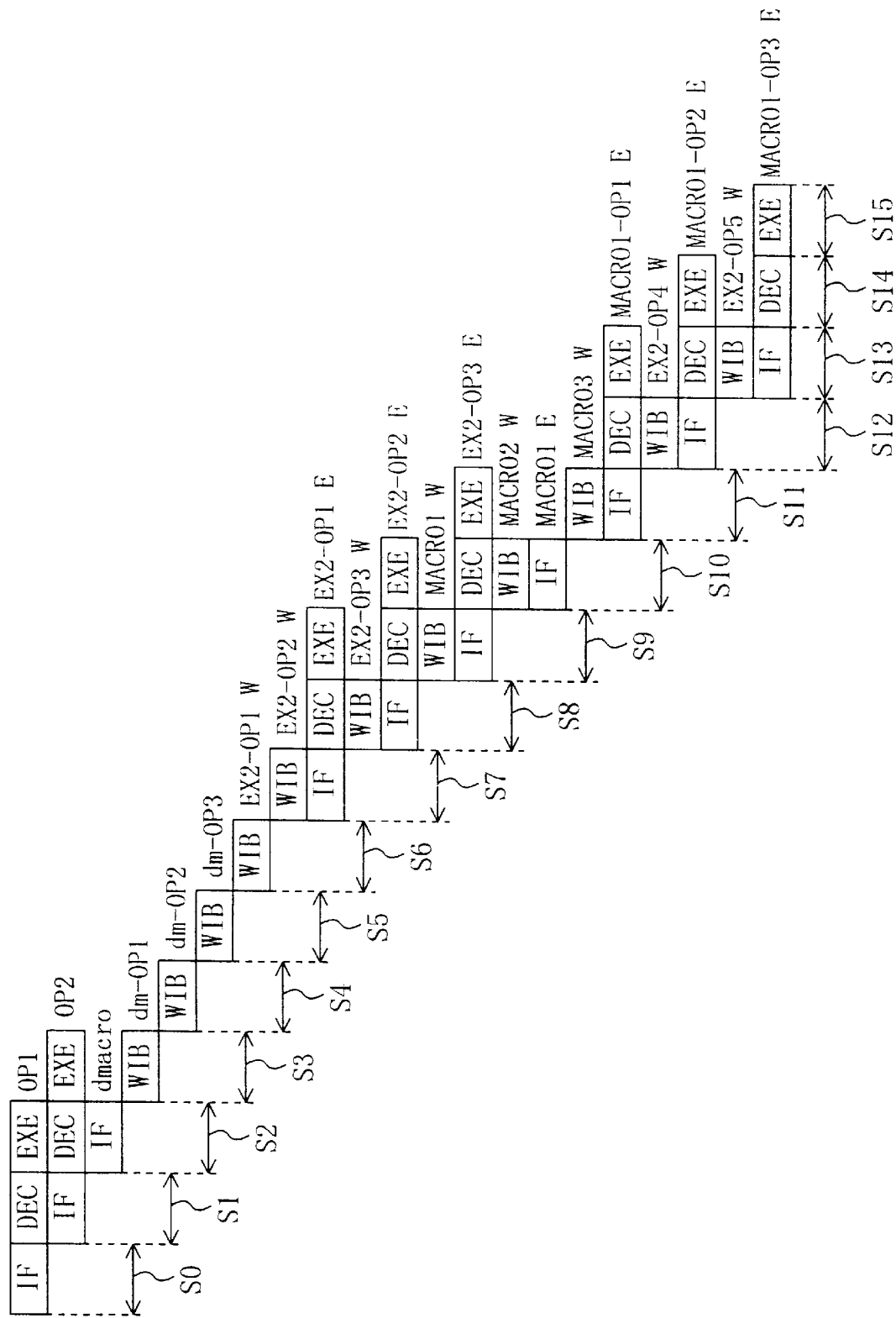
FIG. 14 is a diagram of a pipeline structure of the microprocessor of FIG. 1 corresponding to the execution instruction string of FIG. 12.
Figure 15:
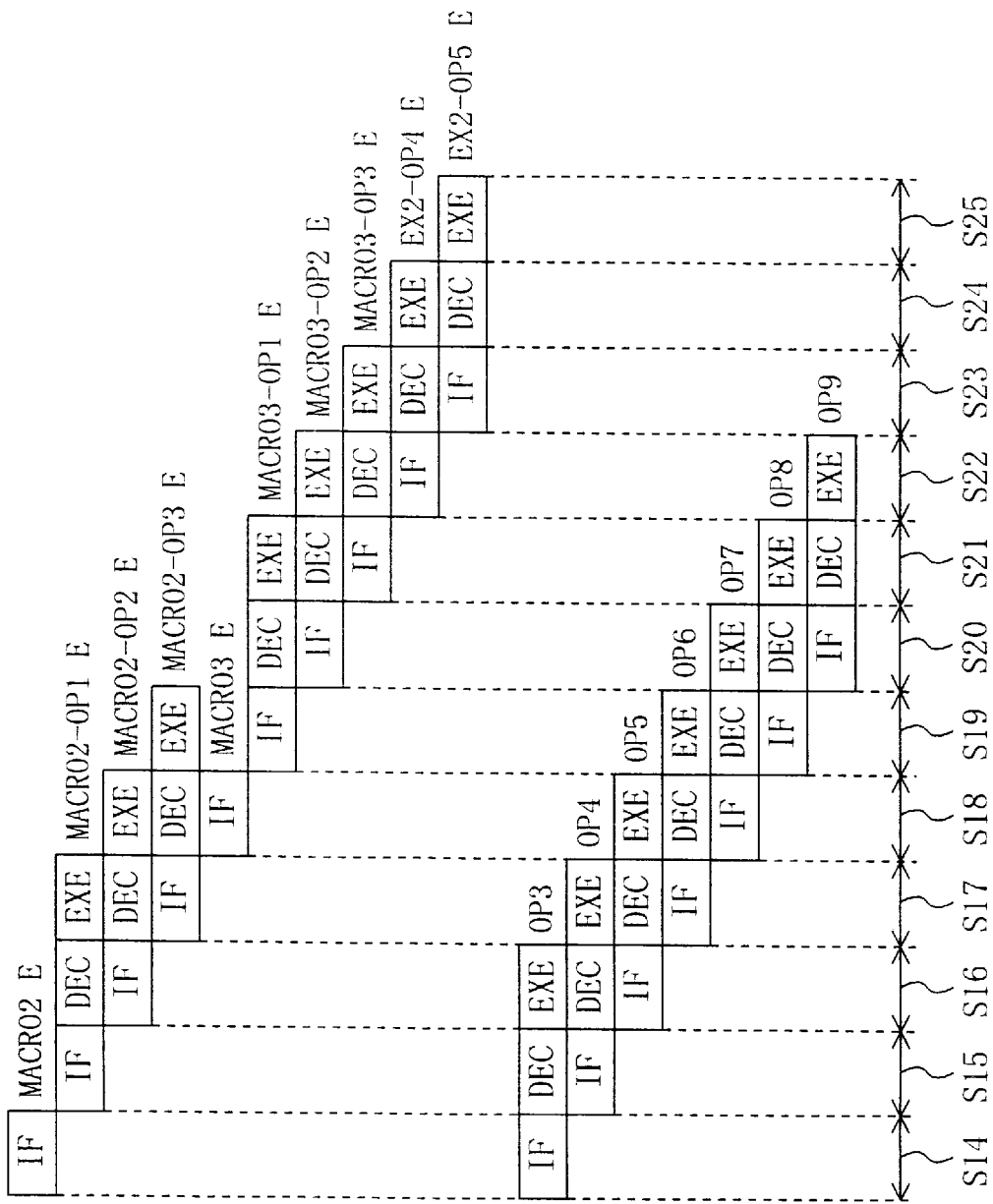
FIG. 15 is a continuation of FIG. 14.

FIGS. 14 and 15 show a pipeline structure of the microprocessor of FIG. 1 on the basis of the instruction string example of FIG. 12. In FIGS. 14 and 15, WIF represents an instruction write operation to the instruction buffer 6b. IF represents an instruction fetch operation from the instruction memory 1 or from the instruction buffer 6b. DEC represents an instruction decode operation in the instruction issue unit 2 or in the instruction decoder 7b. EXE represents an arithmetic execution operation in the arithmetic execution unit 8c or in the arithmetic execution unit 8b. In FIGS. 14 and 15, the rightward direction is the positive direction of time, the vertical downward direction is the flow of execution instructions, and the individual cycles are identified by S0–S25.

At cycle S0, the first instruction (OP1) is fetched from the instruction memory 1. At cycle S1, the first instruction is decoded in the instruction issue unit 2. At cycle S2, a corresponding arithmetic operation to the result of the decoding by the first instruction is executed in the arithmetic execution unit 8c. The second instruction (OP2) is processed in the same way that the first instruction (OP1) is processed.

At cycle S2, the third instruction (dmacro) is fetched from the instruction memory 1. The macro definition instruction (dmacro) is decoded in the instruction issue unit 2. At this time, the instruction issue unit 2 extracts the instruction number DNUM (i.e., the number of instructions forming a macro body) from the macro definition instruction. In the example of FIG. 12, the instruction number DNUM is three (see FIG. 10A). Further, the instruction issue unit 2 sequentially fetches the equal number of instructions to the instruction number DNUM from the instruction memory 1, as a result of which the fourth, fifth, and sixth instructions (i.e., the macro forming instructions dm-OP1, dm-OP2, dm-OP3) are fetched at cycle S3, at cycle S4, and at cycle S5, respectively. These macro forming instructions are sequentially written to the instruction buffer 6b by way of the instruction bus 9a.

The details of write operations of writing the macro forming instructions to the instruction buffer 6b are described. Once the instruction issue unit 2 fetches the macro definition instruction (dmacro) from the instruction memory 1 at cycle S2, the instruction issue unit 2 provides a default control signal over the control bus 9b at cycle S2 so that the 3-input multiplexer 300 selects its third input value. As a result, the register 310 stores an initial address value of zero. Likewise, the registers 311 and 312 each store an initial address value of zero. At cycle S3, the instruction issue unit 2 fetches the first macro forming instruction (dm-OP1) from the instruction memory 1 for forwarding to the instruction bus 9a and provides a control signal to the control bus 9b so that the 2-input multiplexer 303 selects its first input value. By virtue of such control, the value zero, stored in the register 310, is provided as the write address WADRS of the instruction buffer 6b. At this time, a write enable signal is also provided to the instruction buffer 6b, as a result of which the first macro forming instruction (dm-OP1) is stored at the address #0 in the instruction buffer 6b. At cycle S3, the incrementer 320 inputs a value output from the 2-input multiplexer 303 to generate a next cycle write address value of one. At cycle S4, a value one output from the incrementer 320 is fed into the registers 310, 311, and 312. Accordingly, at cycle S4, the value one, stored in the register 310, is provided to the instruction buffer 6b by way of the 2-input multiplexer 303 and the address bus 10b as the write address of the second macro forming instruction (dm-OP2), and the second macro forming instruction (dm-OP2) is stored at the address #1 in the instruction buffer 6b.

Likewise, at cycle S5, the third macro forming instruction (dm-OP3) is stored at the address #2 in the instruction buffer 6b. When the process of writing the three macro forming instructions to the instruction buffer 6b is completed as described above, the registers 310–312 each store a value of three. Thereafter, the values, stored in the registers 310 and 312, will not be updated unless another macro definition instruction is fetched from the instruction memory 1. In other words, the macro definition region 51 is secured in the instruction buffer 6b as shown in FIG. 13. When a different macro definition instruction is fetched from the instruction memory 1, the macro definition region 51 in the instruction buffer 6b is expanded.

At cycle S6, the seventh instruction (i.e., the non-macro forming instruction (EX2-OP1)) is fetched from the instruction memory 1 and the fetched instruction is written to the instruction buffer 6b. At this time, the value three, stored in the register 311, is chosen as the write address WADRS of the instruction buffer 6b. Thereafter, every time a non-macro forming instruction is written to the instruction buffer 6b, the value of the register 311 is updated by a value output from the incrementer 320. However, when the register 311 provides the largest of the addresses in the instruction buffer 6b (i.e., the address #255), the value three, stored in the register 312, is set in the register 311. This prevents non-macro forming instructions from being stored in the macro definition region 51.

At cycle S7, a read operation of reading the seventh instruction (EX2-OP1) from the instruction buffer 6b and a write operation of writing the eighth instruction (EX2-OP2) to the instruction buffer 6b are executed in parallel. The details of read operations of reading the non-macro forming instructions from the instruction buffer 6b are now explained. The value of the register 314 is set at an initial value of three by reference to the register 312. The control block 323 provides a default control signal so that the 2-input multiplexer 306 selects its second input value. By virtue of such control, the value three, stored in the register 314, is provided as the read address RADRS of the instruction buffer 6b. At this time, a read enable signal is also provided to the instruction buffer 6b, as a result of which the seventh instruction is read from at the address #3 in the instruction buffer 6b. The value of the register 314 is updated by the output value of the incrementer 321. Thereafter, every time a non-macro forming instruction is read from the instruction buffer 6b, the value of the register 314 is updated by the output value of the incrementer 321. However, when the register 314 provides the largest of the addresses in the instruction buffer 6b (i.e., the address #255), the value three, stored in the register 312, is set in the register 314. This prevents non-macro forming instructions from erroneously being read from the macro definition region 51.

At cycle S8, the ninth instruction (EX2-OP2) is fetched from the instruction memory 1 and the fetched instruction is written to the instruction buffer 6b. At cycle S9, the first macro call instruction (MACRO1), which is the tenth instruction, is written to the instruction buffer 6b. At cycle S10, the second macro call instruction (MACRO2), which is the eleventh instruction, is written to the instruction buffer 6b. At cycle S11, the third macro call instruction (MACRO3), which is the twelfth instruction, is written to the instruction buffer 6b. The writing of the tenth to twelfth instructions to the instruction buffer 6b is the same as the writing of the seventh to ninth instructions to the instruction buffer 6b. At cycle S12, the thirteenth instruction (EX2-OP4) is written to the instruction buffer 6b. At cycle S13, the fourteenth instruction (EX2-OP5) is written to the instruction buffer 6b.

At cycle S10, the first macro call instruction (MACRO1) is read from the instruction buffer 6b and is decoded in the instruction decoder 7b. At this time, the instruction decoder 7b extracts from the first macro call instruction the top address TOPADR that represents zero in the example of FIG. 12 and the instruction number ENUM that represents three in the example of FIG. 12 (see FIG. 10B). The top address TOPADR and the instruction number ENUM are stored in the register 313 and in the register 315 respectively by way of the control bus 11b. The value of the counter 316 is initialized to zero and the updating of the value of the register 314 is prevented. The control block 323 controls the 2-input multiplexer 306 to select its first input value. The foregoing operations are for the preparation of macro expansion. Thereafter, the value of the counter 316 is incremented every time the cycle advances.

The comparator 322 makes a comparison between the value of the register 315 and that of the counter 316. Upon the receipt of the output of the comparator 322, the control block 323 provides a control signal so that the 2-input multiplexer 306 selects its first input value when the received output shows that the value of the counter 316 falls below that of the register 315. By virtue of such control, the read address of an instruction subsequent to the tenth instruction becomes a storage address at which the register's 313 value (zero) (i.e., the first macro forming instruction (dm-OP1)) is stored. As a result, at cycle S11 the first macro forming instruction, which is represented as MACRO1-OP1 in FIG. 14, is read out. The value of the register 313 is updated according to the output of the incrementer 321 and the value of the counter 316 is incremented.

At cycle S12, a read operation of reading the second macro forming instruction which is represented as MACRO1-OP2 in FIG. 14 is carried out. At cycle S13, a read operation of reading the third macro forming instruction which is represented as MACRO1-OP3 in FIG. 14 is carried out. When the value of the register 315 and that of the counter 316 are equal (i.e., when a reading operation of reading a macro forming instruction from the instruction buffer 6b is carried out by a number of times set in the register 315), the control block 323 provides a control signal so that the 2-input multiplexer 306 selects again its second input value. As a result, the macro expansion on the basis of the first macro call instruction (MACRO1) is finished and the operation moves to the processing of subsequent instructions. Because of the foregoing operations, macro expansion can be achieved in the second arithmetic processing unit 3b including the instruction buffer 6b.

Referring to FIG. 15, macro expansion on the basis of the second macro call instruction (MACRO2) is executed during the period from cycle S14 to cycle S17 and macro expansion on the basis of the third macro call instruction (MACRO3) is executed during the period from cycle S18 to cycle S21. Execution of arithmetic operations relating to the fourteenth instruction (EX2-OP5) by the arithmetic execution unit 8b is completed at cycle S25. On the other hand, the writing of the instructions to the instruction buffer 6b is completed at cycle S13 thereby allowing the instruction issue unit 2 to use the instruction bus 9a and the control bus 9b for operations other than instruction write operations to the instruction buffer 6b from cycle S14 onward. Therefore, all of IF (instruction fetch), DEC (instruction decode), and EXE (arithmetic execution) relating to the fifteenth to twenty-first instructions (from OP3 to OP9) to be executed in the arithmetic execution unit 8c can be completed by cycle S22.

As described above, in accordance with the microprocessor of FIG. 1, programming as to groups of instructions to be executed respectively in the first and second arithmetic processing units 3a and 3b can be facilitated. Additionally, the first arithmetic processing unit 3a is able to autonomously execute iterative processing and conditional execution processing. This decreases the instruction issue rate of the instruction issue unit 2, therefore relieving the load of the instruction bus 9a. The macro definition region 51 is secured within the instruction buffer 6b, therefore allowing the second arithmetic processing unit 3b to autonomously perform a macro expansion process. In respect of reducing the load of the instruction bus 9a, a case of securing a macro definition region within the instruction buffer 6b compares favorably with a case of securing a macro definition region within the instruction memory 1. As the frequency of use of a macro call instruction is increased, the effect of relieving the load of the instruction bus 9a is enhanced.

The number of arithmetic processing units is arbitrary and the number of bits of the EUB can be selected according to the number of arithmetic processing units. An arithmetic processing unit having the same internal structure as the first arithmetic processing unit 3a can be added to the structure of FIG. 1. In such a case, it is possible to perform switching between the arithmetic processing units for every iterative process, therefore making it possible to facilitate the process of programming to a further extent. An arithmetic processing unit having the same internal structure as the second arithmetic processing unit 3b can be added to the structure of FIG. 1. In such a case, it is possible to perform switching between the arithmetic processing units for every macro definition function, therefore making it possible to facilitate the process of programming to a still further extent.

An arithmetic processing unit, which combines the features of the first and second arithmetic processing units 3a and 3b, can be employed. This can provide a macro definition including, for example, iterative processing and conditional branch processing. In the field of DSP (digital signal processing), various functions, such as DCT (discrete cosine transform) and IDCT (inverse discrete cosine transform), are required. If macro instructions (e.g., DCT instructions and IDCT instructions) are prepared for realizing the aforesaid functions, this provides a high-performance microprocessor which is easy to program.

What is claimed is:

1. A microprocessor capable of parallel execution of a plurality of instructions, said microprocessor comprising;

a plurality of arithmetic processing units;

an instruction memory for storing pluralities of instructions to be executed in said plurality of arithmetic processing units respectively; and an instruction issue unit for fetching an instruction from said instruction memory and for providing said fetched instruction to a corresponding one of said plurality of arithmetic processing units;

wherein at least a particular one of said plurality of arithmetic processing units includes:

an instruction buffer for holding a plurality of instructions provided from said instruction issue unit;

an instruction decoder for decoding an instruction read from said instruction buffer;

an arithmetic execution unit for executing an arithmetic operation according to a result of the decoding by said instruction decoder; and an address generation unit for generating a write address of said instruction buffer in response to a control signal received from said instruction issue unit and for generating a read address of said instruction buffer in response to a control signal received from said instruction decoder.

2. The microprocessor of claim 1, wherein said instruction issue unit has a function of determining, according to execution unit designation bits incorporated into an instruction fetched by said instruction issue unit from said instruction memory, which of said plurality of arithmetic processing units is assigned said fetched instruction.

3. The microprocessor of claim 1, said address generation unit having a status flag register for storing a status flag indicating whether said instruction buffer is full of instructions that have not been read out; and said instruction issue unit having a function of controlling supply of instructions to said particular arithmetic processing unit according to said status flag.

4. The microprocessor of claim 1, wherein said address generation unit has control means for controlling a sequence of reading from said instruction buffer so that said particular arithmetic processing unit executes an iterative process specified by an iteration control instruction read from said instruction buffer.

5. The microprocessor of claim 4, said control means including:

a first register for storing a read address of said instruction buffer;

means for updating a value of said first register every time one instruction is read from said instruction buffer;

a second register for storing a number of times an iterative process is to be executed which is designated by an iteration start instruction read from said instruction buffer;

a third register for storing address of an instruction subsequent to said iteration start instruction in said instruction buffer;

a fourth register for storing a number of times said iterative process has been executed;

means for incrementing a value of said fourth register when an iteration stop instruction is read from said instruction buffer;

a comparator for detecting whether a value of said second register is equal to a value of said fourth register; and means for providing a value of said third register to said instruction buffer in order for said iterative process to proceed when no equality is detected by said comparator in spite of said iteration stop instruction being read from said instruction buffer, and for providing to said instruction buffer the address of an instruction subsequent to said iteration stop instruction represented by a value of said first register in order for said iterative process to stop when said iteration stop instruction is read from said instruction buffer and there is an equality detected by said comparator.

6. The microprocessor of claim 1, wherein said address generation unit has control means for controlling a sequence of reading from said instruction buffer in order to allow said particular arithmetic processing unit to execute multiple processing specified by a plurality of iteration control instructions read from said instruction buffer.

7. The microprocessor of claim 1, said particular arithmetic processing unit further having a flag register for storing an arithmetic operation result flag according to a result of the arithmetic operation performed by said arithmetic execution unit and for conveying said arithmetic operation result flag to said address generation unit; and said address generation unit having control means for controlling the sequence of reading from said instruction buffer by referring to said arithmetic operation result flag in order to allow said particular arithmetic processing unit to execute a process specified by a conditional execution instruction read from said instruction buffer.

8. The microprocessor of claim 7, said control means having:

a register for storing a read address of said instruction buffer;

means for updating a value of said register every time one instruction is read from said instruction buffer; and means for providing, when a conditional branch instruction is read from said instruction buffer, a value as a result of adding a relative jump address specified by said conditional branch instruction to a value of said register to said instruction buffer if said arithmetic operation result flag complies with a conditional code specified by said conditional branch instruction, and for providing the address of an instruction subsequent to said conditional branch instruction represented by a value of said register if said arithmetic operation result flag does not comply with said conditional code.

9. The microprocessor of claim 1, wherein, when said instruction issue unit fetches a macro definition instruction from said instruction memory, said instruction issue unit functions to further fetch a plurality of macro forming instructions subsequent to said macro definition instruction from said instruction memory, and to provide said plurality of macro forming instructions to said particular arithmetic processing unit so that said plurality of macro forming instructions are stored in a macro definition region in said instruction buffer.

10. The microprocessor of claim 9, wherein said address generation unit has control means for controlling a sequence of writing to said instruction buffer in order to allow said particular arithmetic processing unit to execute a process corresponding to said macro definition instruction, and for controlling a sequence of reading from said instruction buffer in order to allow said particular processing unit to execute a process specified by a macro call instruction read from said instruction buffer.

11. The microprocessor of claim 10, said control means having:

a first register;

a second register for storing a write address of said instruction buffer;

means for initializing both a value of said first register and a value of said second register to a same value; and means for updating both a value of a first register and a value of said second register every time one macro forming instruction is written to said instruction buffer;

wherein said first register holds a value when a write operation of writing the last of said macro forming instructions to said instruction buffer is completed as an address representative of a boundary between said macro definition region and an open region for non-macro forming instructions in said instruction buffer.

12. The microprocessor of claim 11, wherein said address generation unit further has means for updating a value of said second register by referring to said boundary indicating address held in said first register in order to prevent said non-macro forming instructions from being stored in said macro definition region.

13. The microprocessor of claim 11, said control means further having:

a third register for storing a number of instructions specified by said macro call instruction;

a fourth register for storing a read address of each said macro forming instruction in said instruction buffer;

means for updating a value of said fourth register every time one macro forming instruction is read from said instruction buffer;

a counter for counting a number of macro forming instructions that have been read from said instruction buffer;

a comparator for detecting whether a value of said third register equals a count value of said counter; and means for providing a value of said fourth register to said instruction buffer in order for macro expansion based on said macro call instruction to proceed when no equality is detected in said comparator and for exerting control in order for said macro expansion to stop when an equality is detected by said comparator.

14. The microprocessor of claim 13, said address generation unit further having:

a fifth register for storing a read address of each of said non-macro forming instructions in said instruction buffer; and means for updating a value of said fifth register by referring to said address held in said first register every time one non-macro forming instruction is read from said instruction buffer.

* * * * *